United States Patent [19]

Chang

[11] Patent Number: 4,873,007

[45] Date of Patent: Oct. 10, 1989

[54] METHOD FOR PRODUCING SULFURIZED ALKYLPHENOLS

[75] Inventor: Yuehsiung Chang, Naperville, Ill.

[73] Assignee: Amoco Corporation, Chicago, Ill.

[21] Appl. No.: 249,607

[22] Filed: Sep. 26, 1988

[51] Int. Cl.$^4$ ................ C10M 135/02; C10M 129/00

[52] U.S. Cl. .................................. 252/40.7; 252/42.7; 568/23; 568/40; 568/75

[58] Field of Search ............... 568/23, 40, 75, 716; 252/42.7, 40.7

[56] References Cited

U.S. PATENT DOCUMENTS

| | | | |
|---|---|---|---|
| 3,746,698 | 7/1973 | Hunt et al. | 568/40 |
| 4,510,807 | 5/1985 | Hori et al. | 568/716 |
| 4,664,824 | 5/1987 | Chang et al. | 252/42.7 |
| 4,744,921 | 5/1988 | Liston | 252/42.7 |

*Primary Examiner*—Jacqueline V. Howard
*Attorney, Agent, or Firm*—Matthew R. Hooper; William H. Magidson; Ralph C. Medhurst

[57] ABSTRACT

A process for preparing sulfurized alkyl-substituted phenol which comprises: (1) charging to a reaction system having a reaction vessel equipped with a reflux condenser, (a) alkyl-substituted phenol wherein the alkyl substituent comprises about 8 to about 50 carbons, (b) sulfur, (c) dihydric alcohol, (d) alkaline earth metal base, and (e) water in an amount of from about 0.02 to about 0.4 moles water per mole of alkyl-substituted phenol; (2) reacting (a)–(e) at a temperature of about 270 to about 450° F. at atmospheric pressure for about 1 to 5 hours, said reaction being conducted such that the water charged to the reaction vessel is retained therein by the reflux condenser.

4 Claims, No Drawings

METHOD FOR PRODUCING SULFURIZED ALKYLPHENOLS

BACKGROUND OF THE INVENTION

1. Field of the Invention

The present invention relates generally to the preparation of sulfurized alkylphenols, and, more particularly, preparation thereof via reaction of an alkylphenol with sulfur in the presence of a catalyst mixture comprising water, a dihydric alcohol and an alkaline earth metal oxide or hydroxide. The sulfurized alkylphenols prepared according to the present invention are useful in the lubricant art as oxidation inhibitors and as intermediates in the preparation of neutral and overbased phenate detergents.

2. Discussion of Prior Art

The preparation of sulfurized alkylphenols using sulfur halides as sulfurization agents is well known in the art and is described, e.g., in U.S. Pat. No. 4,104,180. Sulfur halides, however, are relatively expensive reagents and in addition, products thus obtained contain rather corrosive halide components unless the products are subjected to complicated purification steps.

Elemental sulfur is preferred as a sulfurization reagent for alkylphenols. However, elemental sulfur is not as reactive as sulfur halides and a catalyst or catalyst mixture is therefore required. U.S. Pat. No. 3,509,053 disclosed the use of a sodium hydroxide catalyst. However, the presence of sodium in the product or lubricant additives prepared from this product has the disadvantage that the sodium can contribute to alkaline cracking of engine valves particularly in railroad applications. U.S. Pat. No. 3,912,707 described the use of an alkaline earth metal base and dihydric alcohol mixture to promote alkylphenol sulfurization as the first step of a two-step process for phenates. The presence of dihydric alcohol in the finished products, however, contributes to engine lacquer deposits.

SUMMARY OF THE INVENTION

The present invention is directed to a process for preparing sulfurized alkyl-substituted phenol which comprises: (1) charging to a reaction system having a reaction vessel equipped with a reflux condenser, (a) alkyl-substituted phenol wherein the alkyl substituent comprises about 8 to about 50 carbons, (b) sulfur, (c) dihydric alcohol, (d) alkaline earth metal base, and (e) water in an amount of from about 0.02 to about 0.4 moles water per mole of alkyl-substituted phenol; (2) reacting (a)-(e) at a temperature of about 270° to about 450° F. at atmospheric pressure for about 1 to 5 hours, said reaction being conducted such that the water charged to the reaction vessel is retained therein by the reflux condenser. After the reaction, the crude product is preferably stripped with nitrogen to remove the water and residual hydrogen sulfide. If desired, the product can be subject to additional filtering or purification steps known in the art.

The process of the present invention utilizing water as a co-promoter allows a reduction in the amount of alkaline earth metal base and dihydric alcohol that must be present in the reaction mixture to catalyze formation of the sulfurized alkylphenate. This reduction in dihydric alcohol results in a final product having little or no detectable dihydric alcohol content. The very low levels of alkaline earth metal base and dihydric alcohol made possible by the present invention do not have to be removed from the final product.

DETAILED DESCRIPTION

The reactants required for the process of the present invention are: $C_8$ to $C_{50}$ hydrocarbon substituted phenol; (2) elemental sulfur; (3) dihydric alcohol; (4) alkaline earth metal base; and (5) water.

The $C_8$–$C_{50}$ hydrocarbon substituted phenols suitable for use in the present invention are preferably para substituted alkylphenols in which the alkyl substituent is from 8 to 24 carbons in length, e.g., butyl, hexyl, octyl, decyl, dodecyl, hexadecyl, and the like. The alkyl group can be straight chained or branched, saturated or unsaturated.

The dihydric alcohol used herein can be selected, e.g., from ethylene glycol, propylene glycol, trimethylene glycol, and cyclopentanediol. Preferred is ethylene glycol.

The alkaline earth metal base can be selected from magnesium, calcium and barium oxides or hydroxides, calcium hydroxide being preferred.

The mole ratios of reactants (1) through (5) used in the process of the present invention are as follows: 1 to 5 and preferably 1.2 to 2 moles sulfur per mole alkylphenol; 0.01 to 0.1, and preferably 0.02 to 0.05 moles alkaline earth metal base per mole alkylphenol; 0.01 to 0.1 and preferably 0.02 to 0.05 moles dihydric alcohol per mole alkylphenol; and 0.02 to 0.4, and preferably 0.05 to 0.2 moles of water per mole alkylphenol.

The process of the present invention can be conveniently conducted in either a batch or continuous reaction system. In a preferred batch processing scheme, alkylphenol, sulfur, dihydric alcohol, alkaline earth metal base, and water are charged to a reaction system comprising a reaction vessel equipped with a reflux condenser and a vent line. The reaction mixture is heated to 270° to 450° F. and preferably 350° to 370° F. under atmospheric pressure. During this time, hydrogen sulfide is evolved and removed from the system through the vent line. The water is maintained in the system by the reflux condenser. The reaction mixture is maintained at 270° to 450° F. and preferably 350° to 370° F. for a period of 1 to 5 hours and preferably 1 to 2 hours. After the reaction, the crude product is stripped with nitrogen to remove water and residual hydrogen sulfide while cooling to 100° F. to 150° F. A reaction diluent, e.g., 5W oil, is preferably provided so as to allow easy handling of the material during processing. The diluent may be added to the system before, during or after the reaction. The product may be filtered to remove any particulate matter or subjected to other purification steps.

EXAMPLE 1

(Comparative)

Dodecylphenol (210.0 g) was reacted with sulfur (30.7 g) in the presence of 1.5 g of calcium hydroxide and 1.3 g of ethylene glycol. 5W oil (160.0 g) was used as a diluent during reaction. The reaction mixture was heated to 360° F. and maintained at 360° F. for 1 hour in a 1-l resin kettle equipped with a vent line. The crude product was stripped with 0.5 l/min nitrogen to remove residual water and hydrogen sulfide while cooling to 150° F. The final product was obtained by filtration at 150° F. with 40 g Celite on a Buchner vacuum filter.

EXAMPLE 2

(Using the Present Invention)

Example 1 was repeated except that water (3 g) was present in the reaction mixture and a reflux condenser was used to maintain water in the reaction mixture.

The results of Examples 1 and 2 are compared in Table I below.

TABLE I

|  | Example 1 (Without Water) | Example 2 With Water |
|---|---|---|
| Unfiltered BS & W, vol. % | 10.0% | 0.3% |
| Ca, wt. % | 0.03 | 0.2 |
| S, wt. % | 3.4 | 4.9 |
| Glycol, wt. % | N.D. | N.D. |

N.D. = not detectable.
B.S.W = bottom sediment and water.

EXAMPLE 3

Nine runs were carried using the process of the present invention (runs 7, 8 and 9) and a comparative process in which water is not used as a promoter (runs 1-6). The results are summarized in Table II below. In each preparation, 5W oil was added to the reaction mixture in an amount of 200 g oil/g-mole of dodecylphenol.

TABLE II

| Run No. 10482- | Stoichiometry, moles/mole DDP[1] | | | | Reaction Temp, °F. | Reaction Time, min | Unfiltered BS&W,[2] vol % | Product, wt. % | | |
|---|---|---|---|---|---|---|---|---|---|---|
|  | Sulfur | Lime | Glycol | Water |  |  |  | S | Ca | Glycol |
| 1 | 1.2 | 0.1 | 0.1 | 0.00 | 360 | 60 | 0.4 | 4.4 | 0.8 | 0.3 |
| 2 | 1.2 | 0.2 | 0.2 | 0.00 | 360 | 60 | 0.4 | 4.2 | 1.5 | 0.7 |
| 3 | 1.8 | 0.1 | 0.1 | 0.00 | 360 | 60 | 0.3 | 7.8 | 0.8 | 0.3 |
| 4 | 1.8 | 0.2 | 0.2 | 0.00 | 360 | 60 | 0.3 | 6.5 | 1.4 | 0.8 |
| 5 | 1.2 | 0.05 | 0.05 | 0.00 | 360 | 60 | 0.8 | 5.9 | 0.2 | 0.07 |
| 6 | 1.2 | 0.025 | 0.025 | 0.00 | 360 | 60 | 10.0 | 3.4 | 0.03 | N.D. |
| 7 | 1.2 | 0.025 | 0.000 | 0.21 | 360 | 60 | >10.0 | — | — | — |
| 8 | 1.2 | 0.025 | 0.025 | 0.21 | 360 | 60 | 0.3 | 4.9 | 0.2 | N.D.[3] |
| 9 | 1.2 | 0.025 | 0.025 | 0.10 | 360 | 60 | 0.4 | 4.8 | 0.2 | N.D. |

Notes:
[1]dodecylphenol
[2]bottom sediment and water
[3]not detectable

I claim:

1. A process for preparing sulfurized alkyl-substituted phenol which comprises: reacting in a suitable vessel (a) alkyl-substituted phenol wherein the alkyl substituent comprises about 8 to about 50 carbons, (b) sulfur, (c) dihydric alcohol, (d) alkaline earth metal base, and (e) water the amounts of said reactants being as follows: about 1 to about 5 moles sulfur per mole of alkylphenol; about 0.01 to about 0.1 moles dihydric alcohol per mole of alkylphenol; about 0.01 to about 0.1 moles alkaline earth metal base per mole of alkylphenol; and about 0.02 to about 0.4 moles water per mole of alkylphenol, said reaction being conducted such that the water utilized in the reaction is retained in the reaction vessel, and wherein the amount of alkaline earth metal base used in the reaction results in a level of alkaline earth metal in the sulfurized alkylphenol product not exceeding about 1.0 wt. % of the product.

2. The process of claim 1 wherein the amount of water charged to the reaction vessel is from about 0.05 to about 0.2 moles of water per mole of alkyl-substituted phenol.

3. The process of claim 3 wherein the reaction vessel is equipped with gas venting means, and wherein hydrogen sulfide evolved during said reaction is continually removed from the reaction system via said gas venting means.

4. The process of claim 3 wherein the molar amounts of reactants (b), (c), (d) and (e) charged to the reaction vessel per mole of (a) are as follows:

(b) about 1.2 to about 2 moles
(c) about 0.02 to about 0.05 moles
(d) about 0.02 to about 0.05 moles
(e) about 0.05 to about 0.2 moles.

* * * * *

UNITED STATES PATENT OFFICE
CERTIFICATE OF CORRECTION

Patent No. 4,873,007    Dated  October 10, 1989

Inventor(s) Yuehsiung Chang

It is certified that error appears in the above-identified patent and that said Letters Patent is hereby corrected as shown below:

| Col. | Line | |
|---|---|---|
| 4 | 18 | "claim 3" and should read --claim 2-- |
| 4 | 23 | "claim 3" and should read --claim 2-- |

Signed and Sealed this

Twenty-fifth Day of June, 1991

Attest:

HARRY F. MANBECK, JR.

Attesting Officer

Commissioner of Patents and Trademarks